United States Patent
Yin et al.

(10) Patent No.: US 10,929,668 B2
(45) Date of Patent: Feb. 23, 2021

(54) WEARABLE DEVICE AND CONTROL METHOD

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yanyan Yin, Beijing (CN); Falong Han, Beijing (CN); Yue Gu, Beijing (CN); Pijian Cheng, Beijing (CN); Weipeng Fu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/156,375

(22) Filed: Oct. 10, 2018

(65) Prior Publication Data
US 2019/0272427 A1    Sep. 5, 2019

(30) Foreign Application Priority Data
Mar. 1, 2018  (CN) .......................... 201810171054.2

(51) Int. Cl.
*G06F 3/01*     (2006.01)
*G06K 9/00*     (2006.01)
(Continued)

(52) U.S. Cl.
CPC ......... *G06K 9/00671* (2013.01); *G06F 3/016* (2013.01); *G06K 9/3258* (2013.01);
(Continued)

(58) Field of Classification Search
None
See application file for complete search history.

(56) References Cited

U.S. PATENT DOCUMENTS 7,150,164 B2 * 12/2006 Sills ........................ A44C 9/02
                                                                63/33
8,696,357 B2 *  4/2014 AlDossary ........... G09B 21/001
                                                               434/114
(Continued)

FOREIGN PATENT DOCUMENTS

CN     102208144 A     10/2011
CN     202505587 U     10/2012
(Continued)

OTHER PUBLICATIONS

First Office Action for CN Appl. No. 201810171054.2, dated Jul. 31, 2019.

*Primary Examiner* — Shadan E Haghani
(74) *Attorney, Agent, or Firm* — Dinsmore & Shohl LLP

(57) ABSTRACT

The present invention relates to a wearable device and a control method, the wearable device including: a scanning means configured to scan an object to obtain a scanning information; a tactile prompting means coupled to the scanning means and configured to convert the scanning information into a tactile information prompted to a user; and a wearing means configured to connect the tactile prompting means.

14 Claims, 4 Drawing Sheets

(51) Int. Cl.
*G06K 9/32* (2006.01)
*G09B 21/00* (2006.01)
*G10L 15/22* (2006.01)

(52) U.S. Cl.
CPC ......... *G09B 21/003* (2013.01); *G09B 21/006* (2013.01); *G09B 21/007* (2013.01); *G10L 15/22* (2013.01); *G10L 2015/223* (2013.01)

(56) References Cited

U.S. PATENT DOCUMENTS

| | | | |
|---|---|---|---|
| 9,703,271 B2* | 7/2017 | Kim | H01R 13/6205 |
| 10,248,208 B2* | 4/2019 | Kim | G06F 3/01 |

FOREIGN PATENT DOCUMENTS

| | | |
|---|---|---|
| CN | 104173175 A | 12/2014 |
| CN | 205358359 U | 7/2016 |
| CN | 106227339 A | 12/2016 |
| CN | 107157717 A | 9/2017 |

* cited by examiner

WEARABLE DEVICE AND CONTROL METHOD

CROSS-REFERENCE TO RELATED APPLICATIONS

The present application claims priority to Chinese Patent Application No. 201810171054.2 as filed on Mar. 1, 2018, the disclosure of which is incorporated herein by reference in its entirety.

TECHNICAL FIELD

The present disclosure relates to the field of human assistance, and in particular relates to a wearable device and a control method.

BACKGROUND

According to statistics of state authorities, China is a country with the largest number of blind people in the world, namely about 5,000,000, which accounts for 18 percent of the blind people in the world, and the number of low-eyesight people is up to 6,000,000. The blind people need to purchase specific Braille books in aspect of reading, but number and variety of the Braille books are limited. In addition, the blind and weak-eyesight people have various inconveniences in life, for example, some depend on others in travel, clothing or other aspect, and some need special care.

SUMMARY

One aspect of the present disclosure provides a wearable device, including: a scanning means configured to scan an object to obtain a scanning information; a tactile prompting means coupled to the scanning means and configured to convert the scanning information into a tactile information prompted to a user; and a wearing means configured to connect the tactile prompting means.

In some embodiments, the tactile prompting means includes: a controller, including an information converting module for converting the scanning information of the scanning means into a corresponding coding information; and a tactile stimulator for performing a tactile stimulation on a corresponding region of a tactile sensitive part of the user based on the coding information, to convert the scanning information into an identifiable tactile information of the tactile sensitive part.

In some embodiments, the controller further includes: a control module for powering up electrical contacts of the tactile stimulator corresponding to the coding information based on the coding information; the tactile stimulator includes: a contact driving mechanism having a plurality of lifting mechanisms which correspond to the electrical contacts respectively, for driving the corresponding lifting mechanisms to perform a lifting motion when the electrical contacts are powered up.

In some embodiments, the tactile stimulator further includes: a flexible layer disposed between the contact driving mechanism and the tactile sensitive part.

In some embodiments, the coding information includes a Braille coding information.

In some embodiments, a voice prompting means for prompting the scanning information to the user in voice is further included.

In some embodiments, a voice receiving means for receiving the user's voice instruction is further included to trigger at least one of: an information scanning operation of the scanning means, a tactile prompting operation of the tactile prompting means, and a voice prompting operation of the voice prompting means.

In some embodiments, the scanning means includes at least one of:

a first scanning module disposed on one side of the wearing means corresponding to a hand back of the user, for scanning an object on the front and both sides of the user;

a second scanning module disposed on one side of the wearing means corresponding to a palm of the user, for scanning an object which is close to or contacts the user's hand.

In some embodiments, the first scanning module includes at least one of:

an infrared sensing unit for detecting a position and type of an object in a scanning region;

a distance sensing unit for detecting a distance of the object in the scanning region;

an image capturing and analyzing unit for capturing an object image of the scanning region, and determining at least one of type, shape, size, and color of the object based on the object image;

an object feature detecting unit for detecting a material of the object in the scanning region; or the second scanning module includes: a text scanning unit for capturing a text information contained in the object.

In some embodiments, an inflation adjusting means for controlling a wearing conformity of the wearing means by adjusting an amount of gas filled into the wearing means is further included.

Another aspect of the present disclosure provides a control method for a wearable device, including:

scanning an object to obtain a scanning information by a scanning means; and converting the scanning information into a tactile information prompted to the user by a tactile prompting means coupled to the scanning means;

wherein the tactile prompting means is connected with a wearing means.

In some embodiments, the scanning the object includes operations of: scanning a traffic information of a road where the user resides, and distinguishing an obstacle information on the road.

In some embodiments, wherein scanning the object includes operations of: scanning an object in a region as instructed by the user to acquire at least one of type, shape, size, color, and material of the object.

In some embodiments, scanning the object includes operations of: scanning a text information contained in the object.

In some embodiments, receiving the user's voice instruction is further included to trigger at least one of following operations: an information scanning operation, a tactile prompting operation, and a voice prompting operation.

In some embodiments, converting includes operations of: converting the scanning information of the scanning means into a corresponding coding information; performing a tactile stimulation on a corresponding region of a tactile sensitive part of the user based on the coding information, to convert the scanning information into an identifiable tactile information of the tactile sensitive part.

Another aspect of the present disclosure provides a storage medium on which computer instructions are stored, wherein, the computer instructions, when executed by a processor, perform:

scanning an object to obtain a scanning information; and converting the scanning information into a tactile information prompted to a user.

BRIEF DESCRIPTION OF THE DRAWINGS

The drawings that form a part of the specification describe embodiments of the present disclosure and together with the description are used to explain the principles of the present disclosure.

With reference to the drawings, the present disclosure will be more clearly understood from the following detailed description.

It should be understood that the dimensions of the various parts shown in the figures are not drawn in the actual scale. Further, the same or similar reference numerals denote the same or similar components.

DETAILED DESCRIPTION

Figure 1:
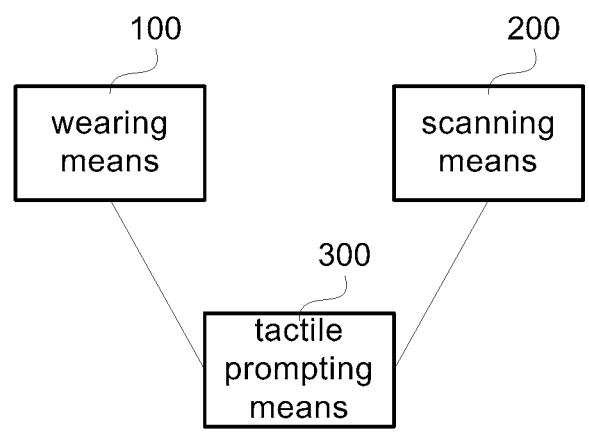
FIG. 1 is a structural schematic diagram of some embodiments according to the wearable device of the present disclosure.

Various exemplary embodiments of the present disclosure will now be described in detail with reference to the drawings. The description of the exemplary embodiments is merely illustrative, and is in no way intended to limit the present disclosure and its applications or usages. The present disclosure may be embodied in many different forms and is not limited to the embodiments described herein. These examples are provided to make the present disclosure thorough and complete, and to fully express the scope of the present disclosure to those skilled in the art. It should be noted that, unless otherwise specified, the relative arrangement of the components and the steps as explained in these embodiments are to be construed as illustrative only and not as a limitation.

The "first", "second", and similar words used in the present disclosure do not denote any order, quantity, or importance, but are merely used to distinguish different parts. The "including", "comprising" or similar words mean that the elements preceding the word include the elements recited after the word, and do not exclude and cover the possibility of the other elements. "Upper", "lower", "left", "right", and etc. are only used to indicate the relative positional relationship, and when the absolute position of the object to be described is changed, the relative positional relationship may also change accordingly.

In the present disclosure, when it is described that a particular device is located between the first device and the second device, there may be intervening devices between the particular device and the first device or the second device, or there may be no intervening devices. When it is described that a particular device is connected to other devices, that particular device can be directly connected to the other device without intervening devices, or without intervening devices directly connected to the other devices.

All terms (including technical or scientific terms) used in the present disclosure have the same meaning as understood by those skilled in the art to which this disclosure belongs, unless specifically defined otherwise. It should also be understood that terms defined in, for example, a general dictionary should be interpreted as having a meaning consistent with their meaning in the context of the related art, and are not intended to be interpreted in an idealized or extremely formalized manner unless explicitly Defined like this.

Techniques, methods and apparatus known to those skilled in the relevant art may not be discussed in detail, but where appropriate, the techniques, methods and apparatus should be considered as part of the specification.

To solve the inconveniences present in life of the blind or low-eyesight people, in some related technologies a device is used to provide a voice guide function for the blind or low-eyesight people, such that these people can acquire desired information without the assistance of eyesight, thus making their life more convenient. However, the voice guide function generally requires a certain sound environment outside, for example in a noisy occasion, it will be possibly difficult to hear the voice prompt, and a hearing loss will possibly occur after long time use.

In view of this, embodiments of the present disclosure provide a wearable device and a control method based on the wearable device, so as to provide assistance and convenience for the user's life.

FIG. 1 is a structural schematic diagram of some embodiments according to the wearable device of the present disclosure. In the embodiments as shown in FIG. 1, the wearable device includes: a scanning means 200, a tactile prompting means 300, and a wearing means 100. The scanning means 200 is configured to scan an object to obtain a scanning information. The tactile prompting means 300 is coupled to the scanning means 200 and configured to convert the scanning information into a tactile information prompted to a user. The wearing means 100 is configured to connect the tactile prompting means 300.

In the present embodiments, the user may use the wearing means 100 to wear the wearable device on his or her own body or at a suitable position on the sensing apparatus (e.g. an electronic skin or artificial limb) used, and use the scanning means 200 to scan the object to obtain the scanning information. The object herein may include an object that exist physically (e.g. street signs, clothes, etc) as well as an object that exist in a non-physical manner (e.g. an electromagnetic field, etc).

The scanning means 200 may scan an surrounding environment in a random way as well as a target object or a target direction to be detected. For example, when the target object is in a scanning region of the scanning means 200 or when the target object enters the scanning region of the scanning means 200 as the scanning means 200 moves relative to the object, the scanning means 200 may scan the object periodically, based on instructions, or in real time.

In some embodiments, the scanning means 200 may be disposed on the wearing means 100. In some other embodiments, the scanning means 200 may either be independent of the wearing means 100 or include a scanning means in other apparatus.

In some embodiments, after the user wears the wearable device, the tactile prompting means 300 is positioned at a corresponding position of the tactile sensitive part of the user in a normal state for convenience of the user to quickly acquire the tactile information in a passive way. In some other embodiments, the tactile prompting means 300 contacts the user's tactile sensitive part when the wearable device is in an operating state. For example, the user's tactile sensitive part is not disposed at a position which is the same as or similar to the position of the tactile prompting means 300 (e.g. positioned on left and right hands of the human body respectively), and when receiving tactile information, the user needs to move the tactile sensitive part to the tactile prompting means 300 for a contact therewith, or move the tactile prompting means 300 to the tactile sensitive part for a contact therewith, for convenience of the user to acquire the tactile information in an active way.

The tactile information converted by the tactile prompting means includes a form of information that can be received directly or indirectly by the user in a tactile way, for example, a short-time contact, an extrusion, a vibration, a current stimulation, a temperature sensing change, or an air impact for the skin. To enable the user to obtain richer tactile information corresponding to the scanning information based on the tactile sensation, e.g. text or graphical information, the tactile information optionally includes an identifiable tactile information of the user's tactile sensitive part. The identifiable tactile information of the tactile sensitive part includes a tiny position, extent and change of the tactile stimulation that is identified accurately by the tactile sensitive part, and such position, extent and change of the stimulation may correspond to a particular coding of text or graphical information.

According to a position where the user's tactile sensitive part resides, the wearing means 100 is worn on a corresponding body part or adjacent part. For example, in some embodiments, the tactile sensitive part includes a finger tip or a finger pulp of the user, and accordingly the wearing means 100 is worn on the user's finger or the palm adjacent to the finger. Again for example, in some other embodiments, the tactile sensitive part includes a hand back or palm of the user, and accordingly the wearing means 100 is worn on the user's palm or the wrist adjacent to the palm.

In other embodiments, the wearing means 100 can be also worn on other part of the user's body, e.g. a leg or foot, and accordingly the tactile sensitive part also includes a sole or toes of the foot, or the like. The wearing means 100 is not limited to a single position. In different embodiments, the wearing means 100 may be simultaneously worn on different part of the body, e.g. hand, head, chest, leg, etc.

The user as mentioned in the embodiments and following embodiments of the wearable device of the present disclosure includes people having eyesight drawbacks, e.g. blind people, low-eyesight people or night blind people, as well as normal-eyesight people with a limited eyesight under certain conditions (e.g. in dark occasions or when the user wears a helmet or glasses that affect normal viewing).

The form of tactile information to the user in the present embodiments generally has no special requirements for beams or sound of the environment where the user resides, which thus provides more occasional adaptability and satisfies the user's assistance demands in more occasions. In addition, some users who have hearing obstacles or are in the occasion where it is inconvenient to hear prompt information can also obtain help and convenience by the present embodiments.

Figure 2:
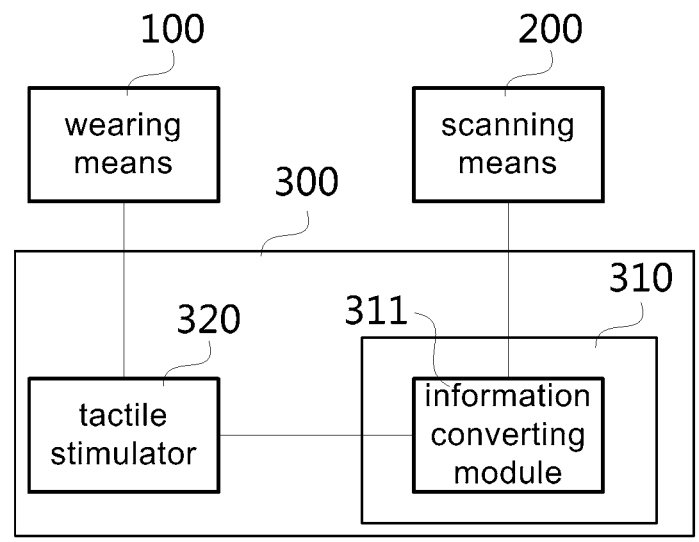
FIG. 2 is a structural schematic diagram of composition of the tactile prompting means in embodiments of the wearable device of FIG. 1.

FIG. 2 is a structural schematic diagram illustrating a composition of the tactile prompting means in embodiments of the wearable device of FIG. 1. In FIG. 2, the tactile prompting means 300 includes: a controller 310 and a tactile stimulator 320. The controller 310 includes an information converting module 311 for converting the scanning information of the scanning means 200 into a corresponding coding information. After the scanning means 200 obtains the scanning information by scanning, the information converting module 311 may process the scanning information so as to convert the scanning information into a coding information that can be processed by the tactile stimulator 320.

In some embodiments, the information converting module 311 can locally perform a specific operation corresponding to the converting operation, e.g. image analyzing, feature matching, coding inquiry, or other specific operation. In some other embodiments, the information converting module 311 can communicate with a processing platform remotely or in the network to transfer part of the converting operation to the processing platform. For example, the information converting module 311 may send an information converting request to the processing platform and then acquire the processed information from the processing platform as a converted information.

The coding information may optionally use encoded information in the form of geometric figure, lattice, symbol, number, or other pattern of coding information. In some embodiments, the coding information may be Braille coding information, and such coding information in a dot matrix manner can facilitate usage of the user who is familiar with the Braille.

In some embodiments, the coding information is pre-stored in the controller 310 in a form of coding libraries, and the coding information corresponding to the scanning information may be obtained by a query operation. In some other embodiments, the coding information can be generated from the scanning information according to a preset generation formula or rule. In some other embodiments, the coding information is binary code according to an entirety or compositions (e.g. radicals) of a Chinese character, for example, the Chinese character "一" corresponds to a coding of 00000000 and the Chinese character "二" corresponds to a coding of 00000001.

The tactile stimulator 320 is used for performing a tactile stimulation on a corresponding region of the tactile sensitive part based on the coding information. A form of the tactile stimulation includes a contact tactile stimulation obtained by forming a surface in a concave and convex form to facilitate the user's press and touch or by applying a touch with a preset frequency to the tactile sensitive position of the user, a contactless tactile stimulation obtained by using a microcurrent or an air impact or controlling a local temperature change of the tactile sensitive part, or a combination of several different tactile stimulation forms. By a stimulation on different regions of the tactile sensitive part, richer identifiable tactile information may be provided.

Figure 3:
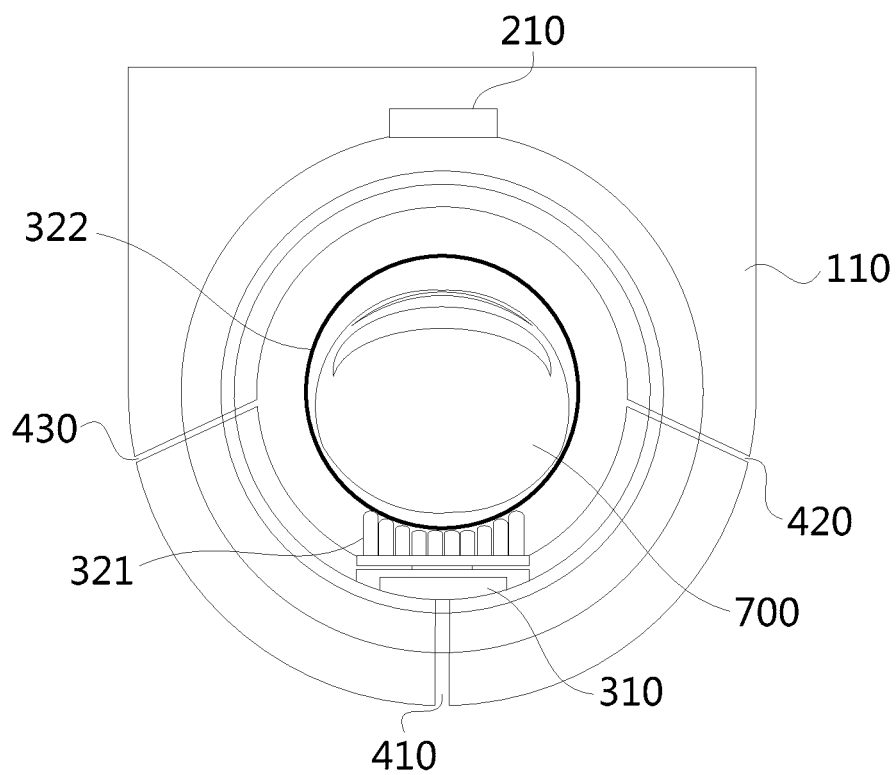
FIG. 3 is a schematic diagram of user wearing of some embodiments according to the wearable device of the present disclosure.

FIG. 3 is a schematic diagram of user wearing of some embodiments according to the wearable device of the present disclosure. In FIG. 3, the controller 310 further includes a control module (not shown) for powering up electrical contacts (e.g. a dot matrix of electrical contacts of a thin film transistor unit) of the tactile stimulator 320 corresponding to the coding information based on the coding information. The tactile stimulator 320 includes a contact driving mechanism 321. The contact driving mechanism 321 has a plurality of lifting mechanisms which correspond to the electrical contacts respectively, e.g. a gas cylinder based on the pneumatic principle, an oil cylinder based on the hydraulic principle, or a contact action shifter based on the relay principle, for driving the corresponding lifting mechanisms to perform a lifting motion when the electrical contacts are powered up.

Referring to FIG. 3, in some embodiments, the wearable device is worn on a finger 700 of the user in form of a ring. Inside the housing 110, an opposite side of the finger pulp of the finger 700 is provided with a contact driving mechanism 321, to which the controller 310 is connected. Tops of the plurality of contact action shifters in the contact driving mechanism 321 may form a curved surface close to the arc of the finger pulp of the finger 700 in an initial state of power-off, such that the finger 700 will not feel an apparent convex structure. When the scanning means 200 is used to scan, the scanning information will be converted into a corresponding convex structure, such that the finger 700 may complete an identification based on the tactile sensation even within a small range of motion.

To protect the contact driving unit or other internal elements, it is prevented from soaking in water or be infiltrated by the user's sweat as far as possible. Referring to the embodiments as shown in FIG. 3, a flexible layer 322 is additionally provided in the tactile stimulator 320. The flexible layer 322 is disposed between the tactile driving mechanism 321 and the tactile sensitive part to realize an isolation. On the other hand, the flexible layer 322 can also improve the tactile feeling of the user. The flexible layer may be made of rubber or silicone.

In some embodiments, the wearable device further includes other accessories that facilitate usage, for example, an inflation adjusting means for controlling a wearing conformity of the wearing means 100 by adjusting an amount of gas filled into the wearing means 100. For example, in FIG. 3 a chamber that accommodates the finger 700 is provided with an inlet 430 and an outlet 420, and expansion and contraction of the chamber that accommodates the finger 700 may be realized by a gas valve control such that the conformity of the chamber to the finger 700 is adjusted. Also, it applies to an adjustment of the wearing conformity of the palm or other part of the body other than the finger. Another accessory for use in the wearable device includes a power source accessory, e.g. a battery disposed in the replaceable battery compartment or a rechargeable battery that is charged via a charging port 410 in FIG. 3.

Figure 4:
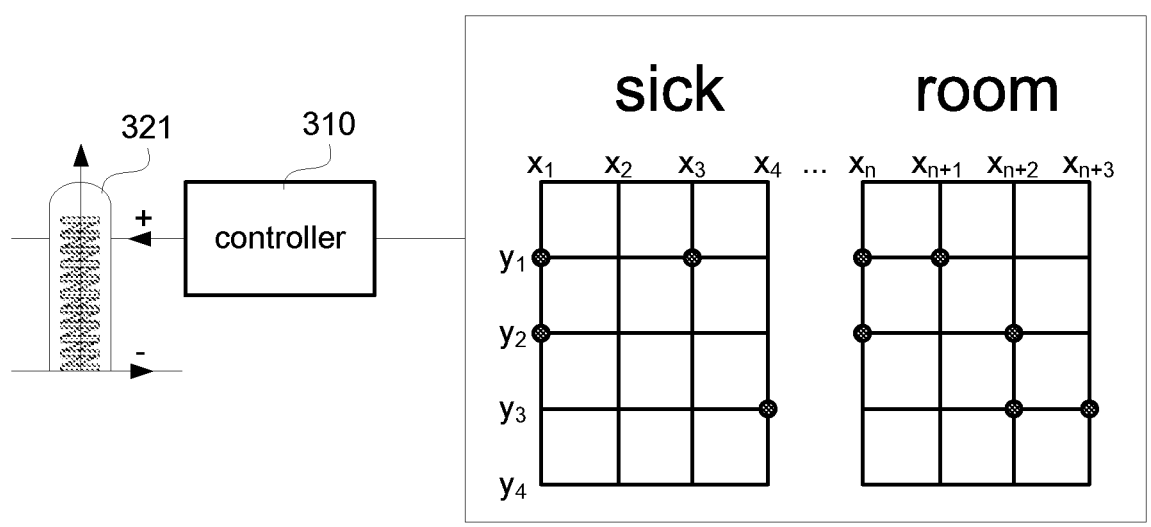
FIG. 4 is a schematic diagram of converting a text code into tactile information in some embodiments according to the wearable device of the present disclosure.

FIG. 4 is a schematic diagram of converting a character code into tactile information in some embodiments according to the wearable device of the present disclosure. Referring to FIG. 4, the coding information obtained by the information converting module 311 may be further converted by the control module into the lifting motion of the plurality of lifting mechanisms. In some embodiments, the tactile stimulator 320 includes thin film transistor units which may be formed in an array of N*M, and electrical contacts of each row and each column are connected to the controller 310 respectively.

The text "sick room" are taken as an example, where the coding information for mapping a word or phrase to a form of dot matrix is $\{(x_1,y_1), (x_1,y_2), (x_3,y_1), (x_4,y_3)\}$; $\{(x_n,y_1), (x_{n+1},y_1), (x_n,y_2), (x_{n+2},y_2), (x_{n+2},y_3), (x_{n+3},y_3)\}$. The control module in the controller 310 can control an electrical switch of the corresponding contact driving mechanism 321 based on each coordinate point in the coding dot matrix. For example, a switch circuit of the contact action shifter based on the relay principle is powered up, the contact action shifter corresponding to the black dot in FIG. 4 performs a lifting action after being powered up, and a convex structure is formed at a corresponding position. At this time, the user may identify the text by touching or pressing the convex structure.

Figure 5:
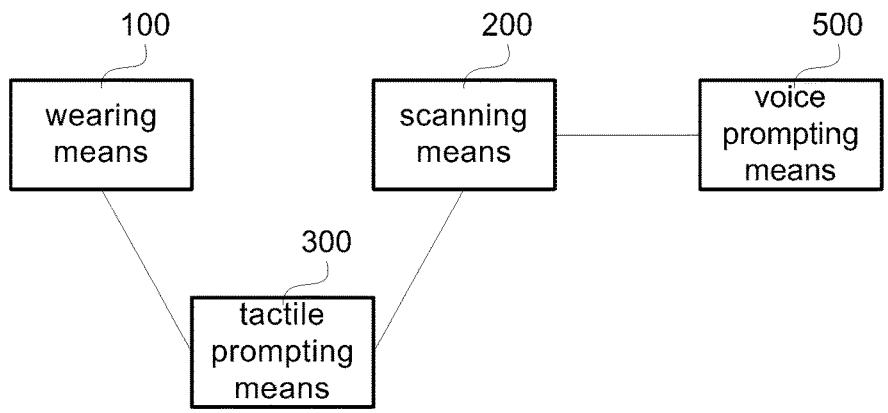
FIG. 5 is a structural schematic diagram of some other embodiments according to the wearable device of the present disclosure.

FIG. 5 is a structural schematic diagram of some other embodiments according to the wearable device of the present disclosure. As compared with the previous multiple embodiments, the wearable device of the present embodiments further includes a voice prompting means 500 for prompting the scanning information of the scanning means 200 to the user in voice. By a voice prompt of the voice prompting means 500, the user may be assisted to understand information. The user may select, according to demands, either or both of the voice prompting means 500 and the tactile prompting means 300.

For the blind or low-eyesight people, the voice prompting means 500 and the tactile prompting means 300 may be used at the same time to learn the Braille. In other words, the scanned text is converted into a corresponding Braille code and text voice, such that the user may determine the touched Braille text based on sound so as to realize a function of learning the Braille.

Figure 6:
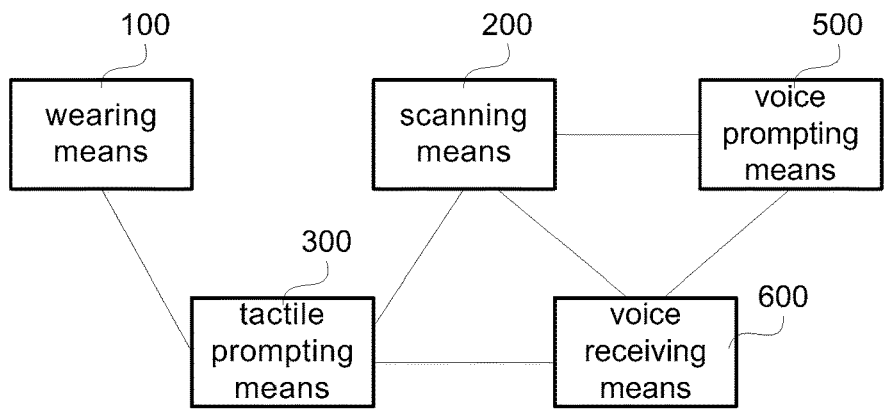
FIG. 6 is a structural schematic diagram of some further embodiments according to the wearable device of the present disclosure.

FIG. 6 is a structural schematic diagram of some further embodiments according to the wearable device of the present disclosure. As compared with the previous embodiment, the wearable device of the present embodiments further includes a voice receiving means 600. The voice receiving means 600 is used for receiving a voice instruction of the user to trigger at least one of the following operations: an information scanning operation of the scanning means 200, a tactile prompting operation of the tactile prompting means 300, and a voice prompting operation of the voice prompting means 500.

The present embodiments may further simplify an inputting operation of the user. For example, a voice instruction is used to require the wearable device to search for a certain article within a space having a preset size around the user, and then the scanning operation of the scanning means 200 may be triggered to search for whether there is a designated article in articles nearby. If there is the designated article, the user is notified by means of a voice prompt or a tactile prompt. If there is no designated article, the user is also notified that nothing is found.

In some embodiments, the scanning means 200 is independent of the wearing means 100, and if the scanning is needed, the user operates the scanning means 200 in a handheld way or the like to scan an object. In some other embodiments, since the user are often used to using the hand to look for a motion path or a particular article, the scanning means 200 may selectively be disposed on the user's hand by means of the wearing means.

Figure 7:
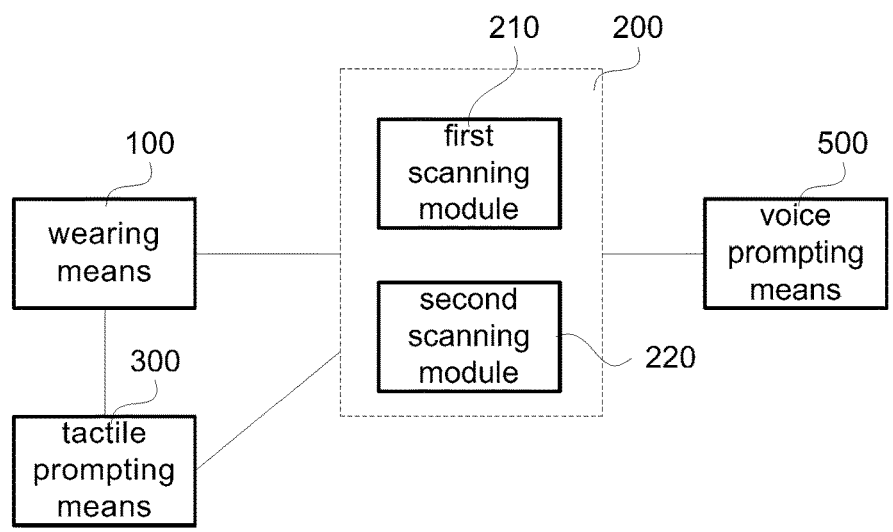
FIG. 7 is a structural schematic diagram of some further embodiments according to the wearable device of the present disclosure.

FIG. 7 is a structural schematic diagram of some further embodiments according to the wearable device of the present disclosure. Referring to FIG. 7, the scanning means 200 of the present embodiments includes at least one of: a first scanning module 210 disposed on one side of the wearing means 100 corresponding to a hand back of the user, for scanning an object on the front and both sides of the user; a second scanning module 220 disposed on one side of the wearing means 100 corresponding to a palm of the user, for scanning an object which is close to or contacts the user's hand.

Combining FIG. 3, in some embodiments, the first scanning module 210 may be disposed on the hand back side of the finger 700. When the user's hand spontaneously droops or swings, the scanning region of the first scanning module 210 corresponds to the front and both sides of the user, so as to conveniently scan an object within the scanning region.

In some embodiments, the first scanning module 210 includes at least one of: an infrared sensing unit for detecting a position and type of an object in a scanning region; a distance sensing unit for detecting a distance of the object in the scanning region. When the user is outdoors, the infrared sensing unit and the distance sensing unit are used to identify traffic conditions, for example, detect a position, type, distance or other information of guardrails, road signs, or artificially-disposed or non-artificially-disposed obstacle on the road, or other object, for convenience of the user to select a suitable travel direction and escape or traverse the obstacles.

In some other embodiments, the first scanning module 210 includes at least one of: an image capturing and analyzing unit for capturing an object image of the scanning region, and determining at least one of type, shape, size, and color of the object based on the object image; an object feature detecting unit for detecting a material of the object in the scanning region.

When the user is looking for an article in a particular region, for example, when looking for suitable clothing indoors, the user may use the image capturing and analyzing unit (e.g. a camera including a Complementary Metal Oxide Semiconductor CMOS or a Charge Coupled Device CCD, an article database, and a processor capable of realizing analysis, comparison or feature matching) to take photo of a plurality of regions of the indoor space to form an object image, and then use images recorded in the article database for analysis and comparison or extract feature information for matching to obtain a corresponding orientation of clothing, for convenience of the user to obtain the found article as instructed. When the user needs to distinguish a material of the article, for example, when a fur coat is desired to be found, an article feature detecting unit, e.g. a Laser Induced Breakdown Spectroscopy, may be used to detect whether a material of the article in the scanning region is fur or not.

To meet the user's demand of distinguishing texts, in some embodiments, the second scanning module 220 includes a text scanning unit for capturing a text information contained in the object. The text scanning unit may be selectively disposed at a position on the palm side, e.g. a finger tip or a finger pulp. In this way, the user may scan character information by touching the text portion of the book, so as to facilitate a text reading of the blind or low-eyesight people or normal people with a limited eyesight, without depending on any specific Braille book, thus expanding the reading range of the user and reducing a purchase cost of the Braille books.

Figure 8:
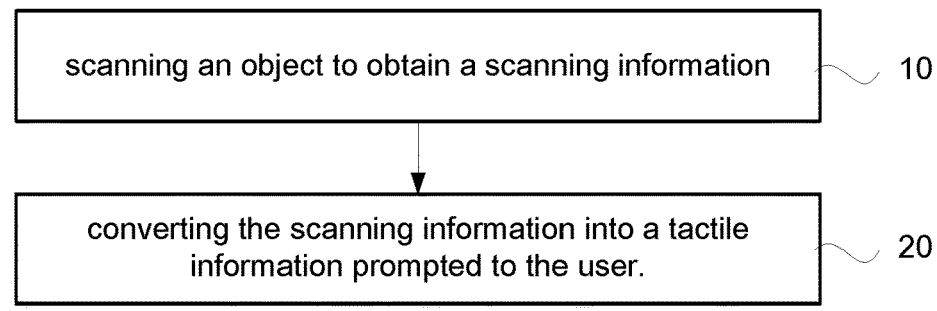
FIG. 8 is a flow schematic diagram of some embodiments according to the control method of the present disclosure.

Based on the aforementioned various embodiments of the wearable device of the present disclosure, the present disclosure further provides a corresponding control method. FIG. 8 is a flow schematic diagram of some embodiments according to the control method of the present disclosure. In the present embodiments, the control method based on the aforementioned wearable device includes:

step 10 scanning an object to obtain a scanning information;

step 20 converting the scanning information into a tactile information prompted to the user.

The user may use the wearing means 100 to wear the wearable device on body, and then actively control the scanning means 200 to adjust the scanning means 200, so as to obtain information to be scanned, or passively receive scanning information of the scanning means 200. In different embodiments, the scanning information may be different and include, e.g. shape, type, size, material, or other attribute information of the article itself, an orientation or distance or other relation information between the article and the user, or pattern, symbol, character, or other information attached to the article. In step 20 the converting operation may be realized by processing the scanning information by the tactile prompting means 300. By converting the scanning information into the tactile information, assistance and convenience are provided to the blind or low-eyesight people, the normal people with a limited eyesight, and other users.

In some embodiments, the information converting process of step 20 includes: converting the scanning information of the scanning means 200 into a corresponding coding information; performing a tactile stimulation on a corresponding region of the tactile sensitive part of the user based on the coding information, to convert the scanning information into an identifiable tactile information of the tactile sensitive part. All alternatives of the coding information form, the tactile stimulation pattern and the sensitive tactile part may refer to the aforementioned embodiments of the wearable device, and are not further described here.

Figure 9:
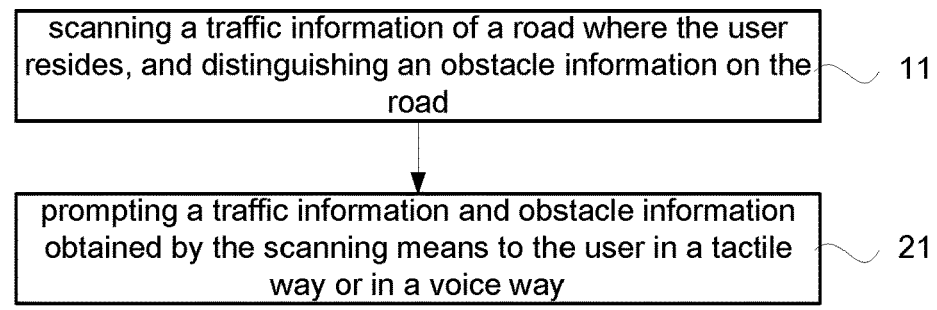
FIG. 9 is a flow schematic diagram of some other embodiments according to the control method of the present disclosure.

FIG. 9 is a flow schematic diagram of some other embodiments according to the control method of the present disclosure. As compared with the previous method embodiments, step 10 of the present embodiments includes step 11, namely scanning a traffic information of a road where the user resides, and distinguishing an obstacle information on the road. In the present embodiments, the user may scan a traffic information of a road where he resides outdoors to obtain a scanning information of an object nearby, e.g. guardrails, walls, road signs, or other objects and distinguish a type, distance, size, or other information of the obstacle on the road.

Generally speaking, the user's arm will spontaneously droop when traveling on the road, and the scanning region of the scanning means 200 will cover the road where the user resides as the arm swings. For the scanning means 200 including the infrared sensing unit, it can determine a type of an object based on a wavelength of reflected light of the object within the scanning region. For the scanning means 200 including the distance sensing unit, it can determine a distance from an obstacle or other object to the user.

In some embodiments, after the scanning means 200 obtains corresponding scanning information by scanning, step 21 in FIG. 9 is performed, namely prompting a traffic information and obstacle information obtained by the scanning means 200 to the user in a tactile way by the tactile prompting means 300, or in a voice way by the voice prompting means 500.

Figure 10:
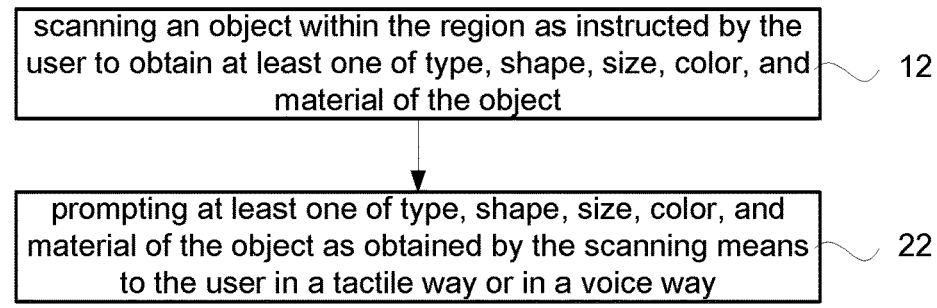
FIG. 10 is a flow schematic diagram of some further embodiments according to the control method of the present disclosure.

FIG. 10 is a flow schematic diagram of some further embodiments according to the control method of the present disclosure. As compared with the embodiments of FIG. 8, step 10 of the present embodiments includes step 12, namely scanning an object within the region as instructed by the user to obtain at least one of type, shape, size, color, and material of the object. In the present embodiments, the user may search for an object within a certain region outdoors or indoors, e.g. search for suitable clothing indoors. The user may point to the region to be searched with the wearable device worn on the hand such that the scanning region of the scanning means 200 covers the region to be searched.

In some embodiments, the scanning means 200 includes an image capturing and analyzing unit which takes photo of the entire or part of the region to be searched and then performs analysis and comparison using images recorded in the article database or extracts feature information for matching so as to determine a type, size, shape, color or the like of the object corresponding to each part of the image. For example, by taking photo as well as analysis and comparison of the image capturing and analyzing unit, a placing position, color, style, or other scanning information of top, pant, socket, shoe, or the like article in the image of the wardrobe region can be obtained. In some other embodiments, the scanning means 200 includes an object feature detecting unit which may detect a material of the object within the scanning region, e.g. a material of the article within the region to be searched.

After the scanning means obtains at least one of type, shape, size, color, and material of the object, in some embodiments step 22 is performed, that is, namely prompting at least one of type, shape, size, color, and material of the object as obtained by the scanning means to the user in a tactile way by the tactile prompting means 300 or in a voice way by the voice prompting means 500.

Figure 11:
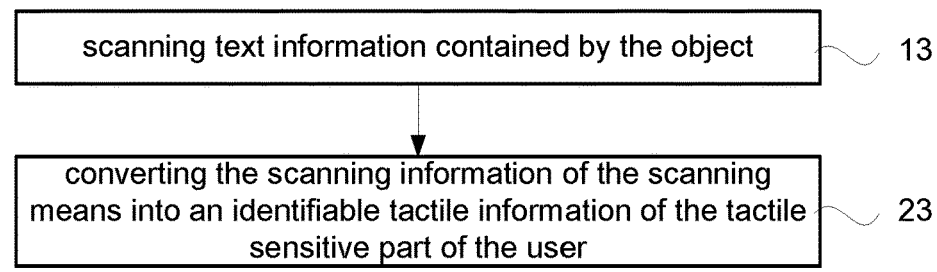
FIG. 11 is a flow schematic diagram of some further embodiments according to the control method of the present disclosure.

FIG. 11 is a flow schematic diagram of some further embodiments according to the control method of the present disclosure. As compared with the embodiments of FIG. 8, step 10 of the present embodiments includes step 13, namely scanning text information contained by the object by the scanning means 200. In the present embodiments, when reading a book, the user may scan texts on book using the scanning means 200 worn on the hand to obtain text information.

After the text information is obtained, in some embodiments, step 23 is performed, namely converting the scanning information of the scanning means 200 into an identifiable tactile information of the tactile sensitive part of the user by the tactile prompting means 300, such that the user can understand text information which he is reading by a tactile sensation. In some other embodiments, the text information as scanned by the user may be selectively played by means of a voice prompt. In further embodiments, the scanning information may be further selectively provided to the user as a voice prompt and a tactile prompt simultaneously or in a preset order, to achieve the purpose of learning the Braille for user.

In some other embodiments, wearing position of the tactile prompting means in the wearable device is far away from the tactile sensitive part, for example, respectively positioned on left hand and right hand. The control method may include sending an identifiable tactile information of the tactile sensitive part to the tactile sensitive part when the tactile prompting means is close to or contacts the tactile sensitive part.

The embodiments of the wearable device including the voice receiving means is previously mentioned. Based on these embodiments, the corresponding control method further includes: receiving the user's voice instruction to trigger the information scanning operation of the scanning means or the voice prompting operation of the non-eyesight interacting means. In this way, the user may control the scanning means, the tactile prompting means, or the voice prompting means by means of a voice instruction.

For example, when the user wishes to travel to a certain destination, the travel destination may be reported in voice. The wearable device searches for a suitable route based on the destination and scans the traffic information on the current road, and the user is prompted for a suitable route and traffic information in voice or tactile sensation. For a particular traffic condition, the user may be further prompted in voice of a motion state and a danger coefficient of a front obstacle, or provided with an action guide, such as issuing a warning to stop moving forward, slow down, etc.

Again for example, the user indoors announces the desire to select the top in voice, the scanning means scans out the type and a placing position of indoor clothes and prompts the user in voice or in a tactile way. Based on the obtained information, the user may further announces report in voice the color and style of the top to be selected, e.g. a black short sleeve shirt. The scanning means further checks the color and style based on the found top and then prompts the user in voice or in a tactile way. When the user announces in voice the name of a certain household appliance indoors, the scanning means scans the household appliances indoors and prompts the user in voice or in a tactile way. The user may operate the household appliance based on the position of the prompted household appliance.

Embodiments of the present disclosure also provide a storage medium having stored thereon computer instructions, wherein the computer instructions, when executed by a processor, perform one or more steps of the aforementioned methods.

The storage medium may include, for example, a system memory, a fixed non-volatile storage medium, or the like. The system memory stores, for example, an operating system, an application, a boot loader, and other programs.

Embodiments of the present disclosure also provide an apparatus including one or more processors configured to execute computer instructions to perform one or more steps of the aforementioned methods.

Those skilled in the art will appreciate that embodiments of the control method of the present disclosure may be provided as a method, system, or computer program product. Accordingly, the present disclosure may take the form of an entirely hardware embodiment, an entirely software embodiment, or a combination of software and hardware aspects. Moreover, the present disclosure may take the form of a computer program product embodied on one or more computer-usable non-transitory storage media (including but not limited to disk storage, CD-ROM, optical storage, etc.) having computer usable program code embodied therein.

The present disclosure is described with reference to flowchart illustrations and/or block diagrams of methods, apparatus (system), and computer program products according to embodiments of the invention. It will be understood that each flow and/or block of the flowcharts and/or blocks embodied by computer program instructions. These computer program instructions can be provided to a processor of a general purpose computer, special purpose computer, embedded processor, or other programmable data processing device to produce a machine, such that means for implementing the functions specified in one or more flows of the flowchart and/or in a block or blocks of the flowchart is produced by instructions executed by the processor of the computer or other programmable data processing device.

These computer program instructions can also be stored in a computer readable memory that can direct a computer or other programmable data processing device to operate in a particular manner, such that the instructions stored in the computer readable memory produce an article of manufacture including the instruction device. The instruction device implements the functions specified in one or more flows of the flowchart and/or in a block or blocks of the flowchart.

These computer program instructions can also be loaded onto a computer or other programmable data processing device such that a series of operational steps are performed on a computer or other programmable device to produce computer-implemented processing for execution on a computer or other programmable device, such that the instructions executed on a computer or other programmable device provide steps for implementing the functions specified in one or more flows of the flowchart and/or in a block or blocks of the flowchart.

The various embodiments in the present specification are described in a progressive manner, and the emphasis of the embodiments is different, and the same or similar parts between the various embodiments may be referred to each other. For the method embodiments, since the whole and the steps involved have a corresponding relationship with the content in the device embodiments, the description is relatively simple, and the relevant parts can be referred to the description of the system embodiments.

Heretofore, various embodiments of the present disclosure have been described in detail. In order to avoid obscuring the concepts of the present disclosure, some details known in the art are not described. Those skilled in the art can fully understand how to implement the technical solutions disclosed herein according to the above description.

While the specific embodiments of the present disclosure have been described in detail by way of example, those skilled in the art will appreciate that the aforementioned example is only for explanation instead of a limit to the scope of the present disclosure. Those skilled in the art will appreciate that the above embodiments may be modified or equivalently substituted for some of the technical features without departing from the scope and spirit of the disclosure. The scope of the disclosure is defined by the appended claims.

What is claimed is:

1. A wearable device, comprising:
   a scanning means configured to scan an object to obtain a scanning information;
   a tactile prompting means coupled to the scanning means and configured to convert the scanning information into a tactile information prompted to a user; and
   a wearing means configured to connect the tactile prompting means;
   wherein the wearable device is worn on a finger of the user in form of a ring, a chamber that accommodates the finger is provided with an inlet and an outlet, and the wearing means further comprises a gas valve configured to control expansion and contraction of the chamber so as to adjust conformity of the chamber to the finger;
   wherein the tactile prompting means comprises:
   a controller, comprising an information converting module for converting the scanning information of the scanning means into a corresponding coding information; and
   a tactile stimulator for performing a tactile stimulation on a corresponding region of a tactile sensitive part of the user based on the coding information, to convert the scanning information into an identifiable tactile information of the tactile sensitive part;
   the controller further comprises: a control module for powering up electrical contacts of the tactile stimulator corresponding to the coding information based on the coding information;
   the tactile stimulator comprises: a contact driving mechanism having plurality of lifting mechanisms which correspond to the electrical contacts respectively, for driving the corresponding lifting mechanisms to perform a lifting motion when the electrical contacts are powered up;
   wherein the tactile stimulator further comprises: a flexible layer disposed between the contact driving mechanism and the tactile sensitive part.

2. The wearable device according to claim 1, wherein the coding information comprises a Braille coding information.

3. The wearable device according to claim 1, further comprising: a voice prompting means for prompting the scanning information to the user in voice.

4. The wearable device according to claim 3, further comprising: a voice receiving means for receiving the user's voice instruction to trigger at least one of the following operations: an information scanning operation of the scanning means, a tactile prompting operation of the tactile prompting means, and a voice prompting operation of the voice prompting means.

5. The wearable device according to claim 1, wherein the scanning means comprises at least one of:
   a first scanning module disposed on one side of the wearing means corresponding to a hand back of the user, for scanning an object on the front and both sides of the user;
   a second scanning module disposed on one side at the wearing means corresponding to a palm of the user, for scanning an object which is close to or contacts the user's hand.

6. The wearable device according to claim 5, wherein,
   the first scanning module comprises at least one of:
   an infrared sensing unit for detecting a position and type of an object in a scanning region;
   a distance sensing unit for detecting a distance of the object in the scanning region;
   an image capturing and analyzing unit for capturing an object image of the scanning region, and determining at least one of type, shape, size, and color of the object based on the object image;
   an object feature detecting unit for detecting a material of the object in the scanning region; or
   the second scanning module comprises:
   a text scanning unit for capturing a text information contained in the object.

7. The wearable device according to claim 1, further comprising: an inflation adjusting means for controlling a wearing conformity of the wearing means by adjusting an amount of gas filled into the wearing means.

8. A control method for a wearable device, comprising:
   scanning an object to obtain a scanning information by a scanning means; and
   converting the scanning information into a tactile information prompted to a user by a tactile prompting means coupled to the scanning means;
   wherein the tactile prompting means is connected with a wearing means, the wearable device is worn on a finger of the user in form of a ring, a chamber that accommodates the finger is provided with an inlet and an outlet, the tactile prompting means comprises: a controller comprising an information converting module for converting the scanning information of the scanning means into a corresponding coding information and a tactile stimulator for performing a tactile stimulation on a corresponding region of a tactile sensitive part of the user based on the coding information, to convert the scanning information into an identifiable tactile information of the tactile sensitive part, the controller further comprises: a control module for powering up electrical contacts of the tactile stimulator corresponding to the coding information based on the coding information; and the tactile stimulator comprises: a contact driving mechanism having a plurality of lifting mechanisms which correspond to the electrical contacts respectively, for driving the corresponding lifting mechanisms to perform a lifting motion when the electrical contacts are powered up, wherein the tactile stimulator further comprises: a flexible layer disposed between the contact driving mechanism and the tactile sensitive part; and the control method further comprises:

controlling expansion and contraction of the chamber by a gas valve so as to adjust conformity of the chamber to the finger.

9. The control method according to claim 8, wherein the scanning the object comprises operations of: scanning a traffic information of a road where the user resides, and distinguishing an obstacle information on the road.

10. The control method according to claim 8, wherein scanning the object comprises operations of: scanning an object in a region as instructed by the user to acquire at least one of type, shape, size, color, and material of the object.

11. The control method according to claim 8, wherein scanning the object comprises operations of: scanning an text information contained in the object.

12. The control method according to claim 8, further comprising:

receiving the user's voice instruction to trigger at least one of following operations: an information scanning operation, a tactile prompting operation, and a voice prompting operation.

13. The control method according to claim 8, wherein converting comprises operations of:

converting the scanning information of the scanning means into a corresponding coding information;

performing a tactile stimulation on a corresponding region of a tactile sensitive part of the user based on the coding information, to convert the scanning information into an identifiable tactile information of the tactile sensitive part.

14. A non-transitory storage medium on which computer instructions are stored, wherein, the computer instructions, when executed by a processor, perform:

scanning an object to obtain a scanning information by a scanning means;

converting the scanning information into a tactile information prompted to a user by a tactile prompting means coupled to the scanning means, wherein the tactile prompting means is connected with a wearing means, the wearable device is worn on a finger of the user in form of a ring, and a chamber that accommodates the finger is provided with an inlet and an outlet; and controlling expansion and contraction of the chamber by a gas valve so as to adjust conformity of the chamber to the finger, wherein the tactile prompting means comprises: a controller comprising an information converting module for converting the scanning information of the scanning means into a corresponding coding information and a tactile stimulator for performing a tactile stimulation on a corresponding region of a tactile sensitive part of the user based on the coding information, to convert the scanning information into an identifiable tactile information of the tactile sensitive part; the controller further comprises: a control module for powering up electrical contacts of the tactile stimulator corresponding to the coding information based on the coding information; the tactile stimulator comprises: a contact driving mechanism having a plurality of lifting mechanisms which correspond the electrical contacts respectively, for driving the corresponding lifting mechanisms to perform a lifting motion when the electrical contacts are powered up, wherein the tactile stimulator further comprises: flexible layer disposed between the contact driving mechanism and the tactile sensitive part.

* * * * *